April 1, 1958   E. SOLER FONT   2,829,287
VENTILATING ELECTRIC UNIT
Filed Feb. 1, 1955
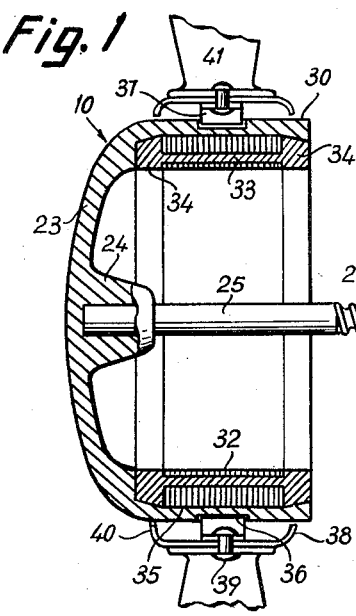
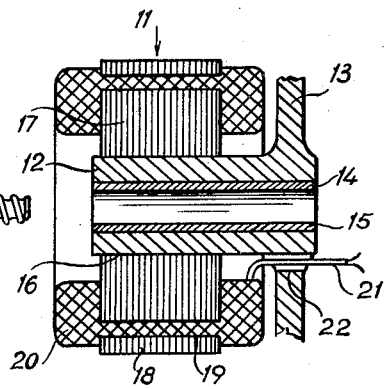
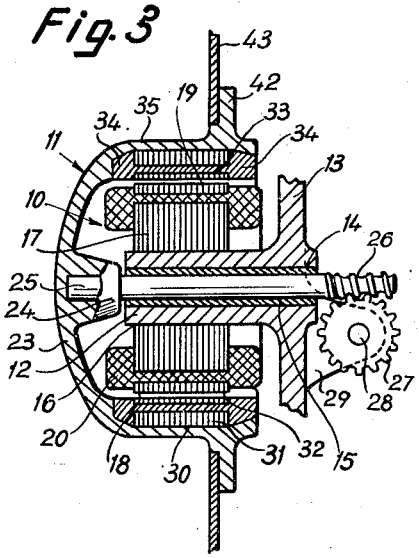
INVENTOR.
EDUARDO SOLER FONT
BY
Wenderoth, Lind & Ponack
Attys.

United States Patent Office 2,829,287
Patented Apr. 1, 1958

2,829,287

VENTILATING ELECTRIC UNIT

Eduardo Soler Font, Barcelona, Spain

Application February 1, 1955, Serial No. 485,489

Claims priority, application Spain February 8, 1954

1 Claim. (Cl. 310—78)

The present invention relates to a ventilating electric unit particularly applicable for home and industrial uses with low or medium power requirements.

Hitherto, the apparatus for moving fluids by means of spinning profiled blades, such as fans or exhausters, either axial or radial, axial compressors, centrifugal compressors and the like have consisted of a streamlined body inserted in the fluid flow, the said body comprising either the blade driving motor or members merely intended for rotatably supporting the said blades and a corresponding carrier core, and the gears for connecting the core with the driving motor in the cases wherein this is placed outside of the fluid flow. In either case this streamlined body is of a size which interferes with the aerodynamic efficiency of the installation, particularly when the fluid flow produced by the unit is held within the limits imposed by conduits, tunnels and the like, due to its influence on the effective passage sections.

The invention has as an object to provide an improved construction applicable to ventilating electric units by means of which the essential members of the unit are reduced to two in number.

A further object of the invention is to provide a ventilating electric unit wherein the cooling of the electric windings and magnetic circuits of the unit motor section is more effective than with the construction hitherto known.

A still further object of the invention is to provide a motor section for a unit of the kind set forth, wherein a substantially greater diameter armature gap is formed, without a substantial increase in the overall measurements of the unit, which has not been possible with the constructions employed up to date, thereby ensuring a far greater power-weight ratio.

According to the invention the electric unit comprises two essential elements, the one fixed and constituting a single body with the stator armature of the electric motor, which armature is formed of an annular pack of magnetic laminations with slots adjacent to the outer cylindrical surface and conductors or windings in the said slots, the said conductors or windings being connectable to an alternating electric current source for generating a revolving magnetic field, said pack housing within the other element, means for rotatably supporting a shaft carrying the other element, the other element being constituted by a bell rigidly secured to said shaft and participating in the rotation thereof, the bell being connected with an annular rotor which revolves with the bell and encloses the stator armature, the said rotor being constituted by another annular pack of magnetic laminations with slots adjacent to the inner cylindrical surface thereof filled with electric conductors which, together with the corresponding shorting rings located at the bases of the said annular body comprise a squirrel cage, said other element supporting air impulsing means for the ventilation.

The nature of the impulsing means will depend mainly on the kind of application for which the unit is designed and they may be fan blades or other propeller means. Likewise, these blades or propellers may be secured to the other element either in a rigid manner or through a friction device allowing some relative movement between both elements when an abnormal resistance takes place.

Other and further objects of the invention will be apparent from the following detailed discussion of a preferred embodiment of the invention taken together with the accompanying drawing in which:

Figure 1 shows the rotor element disassembled from the stator element in diametral section;

Figure 2 is a similar showing of the stator element disassembled from the rotor element; and Figure 3 is a diametral section of the assembled motor section of a ventilating electric unit.

The motor section of the ventilating unit according to the invention consists of the rotor 10 and the stator 11 separately shown in the Figures 1 and 2.

The stator comprises an essentially cylindrical body 12 which is integral with a supporting piece 13 which may assume the suitable arrangement for each particular application, such as a fan standard, stationary or rotatable, axial ventilator arms and the like, centrifugal ventilator or the like.

The cylindrical body 12 has a longitudinal bore 14 in which the most suitable bearings may be mounted, for example a porous bronze self lubricated bearing 15 for rotatably supporting the rotor shaft 10 which is described hereafter.

It is obvious that, if desired, the bearing 15 may be changed to any other mechanical arrangement giving the same effect, such as needle races or direct sliding of the shaft on the wall of the bore.

The outer surface 16 of the body 12 is machined according to well known procedures in order to hold rigidly a magnetic core, made of laminations 17, which core or pack has a cylindrical annular shape with the outer surface 18 substantially coaxial with the bearing 15. The pack 17 has longitudinal slots 19 adjacent to the surface 16 thereof and which extend the length of the pack. In the embodiment shown these slots are parallel to the pack axis and are located at a given distance from the surface 16, but it is understood that these slots may be formed according to any construction commonly utilized in the construction of revolving electrical machines.

These slots are regularly distributed around the periphery of the pack 17 and have coiled therein electric conductors that constitute windings 20 adapted to produce a revolving field when they are connected to an alternating current electrical current source.

The connection terminals 21 for these windings may be carried to the outside of the device, for example through openings or holes 22 formed in the body or supporting member 13.

Rotor 10 is formed of a bell-shaped part 23 having a core 24 in the inner central portion thereof in which core is rigidly fixed the end of a shaft 25 which extends towards the bell mouth and protruding from the same.

The shaft 25 is machined to fit rotatably in the bearing 15 and preferably has the free end thereof terminated in a threaded spindle 26 adapted to mesh with a corresponding worm wheel 27, Figure 3, secured to a shaft 28 rotatably mounted on supports 29 secured to the member 13. Shaft 28 may be, for example, with a conventional mechanism for oscillating the fan at the same time as it revolves. This feature is well known and a detailed description thereof is not deemed necessary.

The bell 23 has a cylindrical portion 30 which houses a rotor formed of magnetic laminations in an annular pack 31 formed with a cylindrical inner surface with dimensions which will form a suitable air gap for the performance of the unit, between the said surface 32 and the surface 18 of the stator when the rotor surrounds the stator.

The pack 31 has slots or drills holes 33 extending longitudinally thereof and adjacent to the surface 32, permitting the formation of a squirrel cage by insertion therein of a given amount of a conducting alloy. The alloy is inserted so that the bars which lie within the slots 33 are integral with two shorting rings 34, one at each end of the pack.

The finish of the outer surface 35 of the pack 31 is not critical, although to ensure good anchorage to the bell 23, it is advisable to provide some roughness in this surface. It is preferred to give the pack a cylindrical shape, such as will normally be formed by the laminations, and giving the shorting rings a slight taper, as is shown in the figures, which is enough to ensure securing of the pack to the bell.

Preferably, the bell 23 is cast on the described rotor unit so that upon cooling of the material of the bell, the pack 31, the rings 34 and the bell 23 constitute a single piece, through which is easily conducted all of the heat produced in the windings and magnetic circuits of the motor described, which heat is rapidly dissipated in the very air impelled by the ventilating unit.

As the diameter of the air gap in an electric motor is a factor which directly influences the value of the mechanical power obtained, it is clearly appreciated that the substantial increase of this diameter in the present case as compared with that formed in the motors corresponding to the usual construction in which the windings—now placed within the gap—must be placed externally thereto, thus reducing the diameter of this gap or alternatively correspondingly increasing the overall measurements of the machine obtained, result in more power for the given motor size.

The motor unit built as described may be associated with diverse modes of fluid impeller means, of which those described in connection with Figures 1 and 3 are cited merely for illustrative purposes.

In the case of Figure 1, the cylindrical portion 30 of the bell 23 has formed thereon a peripheral slot 36 in the bottom of which the free ends of blade springs 37 bear, the springs being secured by the opposite ends thereof to the inner side of a ring 38 by means of rivets 39. Ring 38 has the edges thereof bent inwardly as shown at 40, thus concealing the said rivets.

This construction provides a friction engagement between the motor section and the fan blades, so that if these encounter a resistance prone to cause damage during the operation of the device, the blades are stopped easily due to their low inertia, while the relatively heavy portions of the motor section continue to revolve due to slippage of the springs 37 in the slot 36.

In this case it is also possible to utilize other friction couplings which fall within the essentials of the invention, for example, by merely filling the inside of the ring 38 and slot 36 with a substantially elastic or flexible material, such as sponge rubber or felt.

In the embodiment of Figure 3, the bell 23 extends in a flange 42 to which other members generally shown at 42 may be secured.

I claim:

A ventilating electric unit comprising two essential elements, one of said elements being fixed and comprising a body, a stator armature on said body constituted by a cylindrical pack of annular magnetic laminations having slots in the outer cylindrical surface thereof, and secured to said one of said elements, and conductors in said slots, said conductors being adapted to be connected to an alternating electric current source, and the second of said elements comprising a shaft rotatably mounted on said first element, a bell rigidly secured to said shaft, a cylindrical annular rotor armature in said bell surrounding said stator armature and constituted by an annular pack of magnetic laminations having slots therein adjacent the inner cylindrical surface thereof, conductors in said slots, and shorting rings on the ends of said rotor armature connected to said conductors to form a squirrel cage, an outer ring on said bell frictionally coupled to said bell, and fan blades on said outer ring.

References Cited in the file of this patent

UNITED STATES PATENTS

| 765,078 | Jigouzo | July 12, 1904 |
| 2,048,421 | Ballentine | July 21, 1936 |
| 2,053,425 | Else | Sept. 8, 1936 |
| 2,427,947 | Koch | Sept. 23, 1947 |

FOREIGN PATENTS

| 648,665 | Great Britain | Jan. 10, 1951 |